United States Patent [19]

Billington

[11] 4,241,826
[45] Dec. 30, 1980

[54] CONVEYOR ASSEMBLY SUPPORT STRUCTURE AND HIGH STRENGTH TUBULAR BEAM THEREFOR

[76] Inventor: Charles J. Billington, P.O. Box 4204, Modesto, Calif. 95352

[21] Appl. No.: 925,706

[22] Filed: Jul. 18, 1978

[51] Int. Cl.³ .............................................. B65G 39/10
[52] U.S. Cl. .................................................... 198/825
[58] Field of Search ............... 198/824, 825, 826, 827, 198/828, 829, 830, 860, 818, 501

[56] References Cited

U.S. PATENT DOCUMENTS

| | | | |
|---|---|---|---|
| 1,838,190 | 12/1931 | Robbins | 198/830 |
| 2,592,831 | 4/1952 | Spurgeon et al. | 198/501 |
| 2,959,256 | 11/1960 | Deam | D25/32 X |
| 3,259,227 | 7/1966 | Steinmetz | 198/501 |
| 3,327,838 | 6/1967 | Jonker | 198/825 |
| 3,504,785 | 4/1970 | Gartner | 198/825 X |
| 3,796,503 | 3/1974 | Dawson | 198/818 X |
| 4,032,002 | 6/1977 | Jackson | 198/808 |

FOREIGN PATENT DOCUMENTS 8107 7/1956 Fed. Rep. of Germany ........... 198/829
274109 6/1951 Switzerland .............................. 198/829

OTHER PUBLICATIONS

Van Huffel Catalog L-56, Jan. 1953, p. 60.

*Primary Examiner*—Robert B. Reeves
*Assistant Examiner*—Douglas D. Watts
*Attorney, Agent, or Firm*—Warren, Chickering & Grunewald

[57] ABSTRACT

A conveyor assembly support structure and high strength tubular beam free of debris trapping surfaces is disclosed. The conveyor assembly support structure includes a plurality of trapezoidal beams having sloped top walls, vertical side walls and a horizontal bottom wall. The side and bottom walls of the tubular beams provide conveniently oriented surfaces for high strength connection of other support members thereto, while the sloped top walls tend to deflect debris and prevent trapping and the buildup of contaminants on the beams. The sloped top walls are particularly well suited for the support of roller elements for a trough-type conveyor.

7 Claims, 1 Drawing Figure

CONVEYOR ASSEMBLY SUPPORT STRUCTURE AND HIGH STRENGTH TUBULAR BEAM THEREFOR

BACKGROUND OF THE INVENTION

In many industrial belt conveyor applications there exists a constant problem in connection with cleanliness and corrosion. Thus, when corrosive materials, food products or chemicals are being conveyed by a belt-type of conveyor, the conveyor assembly support structure or frame must be constantly or periodically supervised to insure that debris, contaminants and other undesirable particles, fluids and the like do not buildup, become trapped or accumulate upon the conveyor support structure. Such buildups can damage the conveyor frame through corrosion or can contaminate the materials being conveyed on the conveyor belt, or both.

Accordingly, it is not uncommon for considerable effort to be directed toward conveyor maintenance in the form of cleaning the belt supporting frame of a conveyor assembly. While periodic cleaning can be of substantial assistance, the basic construction of the conveyor assembly support structure should be one which is inherently "clean," that is, free of horizontal and other surfaces which will trap debris or cause the buildup of contaminants.

Some limited effort has been previously undertaken to provide conveyor frame systems which are relatively free of debris trapping surfaces. Perhaps the most commonly employed approach is to employ square tubular beams which are oriented so that all of their side walls extend along diagonals. U.S. Pat. No. 3,796,503 is typical of a conveyor support system which is so constructed.

The problem with this approach is that it is very difficult to connect together cross members and support posts to a beam oriented as shown in U.S. Pat. No. 3,796,505. The "solution" of this patent is relatively complex and includes upwardly facing U-shaped members which are certain to trap contaminants.

Another approach is to employ cylindrical support beams under the conveyor. This type of system is illustrated in U.S. Pat. No. 3,327,838. It similarly presents a relatively complex problem with respect to coupling other beams and frame elements to the cylindrical beams.

Beams formed from angle members having the apex of the two legs pointing upwardly have also been employed as conveyor support frames. Typical of this approach are U.S. Pat. Nos. 3,259,227 and 1,838,190 and to some extent U.S. Pat. No. 4,032,002. Again, there are substantial connection or coupling problems in attempting to build a conveyor frame or support structure from angle members, and these prior support systems usually resort to a construction in which the angle members are in turn supported on horizontally oriented upwardly facing surfaces that will act as sites for debris buildup.

Still another approach to the construction of a conveyor support frame is shown in U.S. Pat. No. 2,592,831.

OBJECTS AND SUMMARY OF INVENTION

A. Objects of the Invention.

Accordingly, it is an object of the present invention to provide a conveyor assembly in which there is a high strength support structure that is free of debris and contaminant trapping surfaces.

Another object of the present invention is to provide a conveyor assembly support structure having high strength and capable of supporting heavy loads.

Another object of the present invention is to provide a conveyor assembly support structure which is easy and inexpensive to erect at the job site.

Still another object of the present invention is to provide a conveyor assembly support structure which is particularly well suited for trough-type conveyors.

A further object of the present invention is to provide a conveyor assembly support structure having high torsional resistance, high fatigue resistance and greater flexibility in accommodating a wide range of conveyor and installation configurations.

Another object of the present invention is to provide a high strength tubular beam for a conveyor frame or the like which has no debris or contaminant trapping surfaces and yet has both horizontal and vertical planar surfaces for securement of other frame elements thereto in high strength connections.

The conveyor assembly support structure and high strength tubular beam of the present invention have other objects and features of advantage which are set forth in or will be apparent from the following description of the preferred embodiment and the accompanying drawing.

B. Summary of the Invention.

The conveyor assembly support structure of the present invention is comprised, briefly, of a longitudinally extending beam positioned beneath the upper portion of an endless conveyor belt. The beam is formed as a tubular member having vertical side walls, a horizontal bottom wall and a pair of upwardly sloped top walls. Secured to longitudinal beam at the side walls thereof are cross-beam members, and roller elements for support of the endless belt are supported from the sloped top walls of the longitudinal beam. The entire support structure is devoid of upwardly facing horizontal surfaces, and the cross-beam members are also preferably trapezoidal tubular members formed in the same manner as the longitudinally extending tubular beam. A return portion of the endless belt can be supported on rollers beneath the longitudinal beam from posts secured to the bottom of the crossbeam members. The beam of the present invention is bent from a single sheet by a press brake and welded along a seam extending longitudinally down the middle of the bottom wall of the beam.

DESCRIPTION OF THE PREFERRED EMBODIMENT

Figure 1:
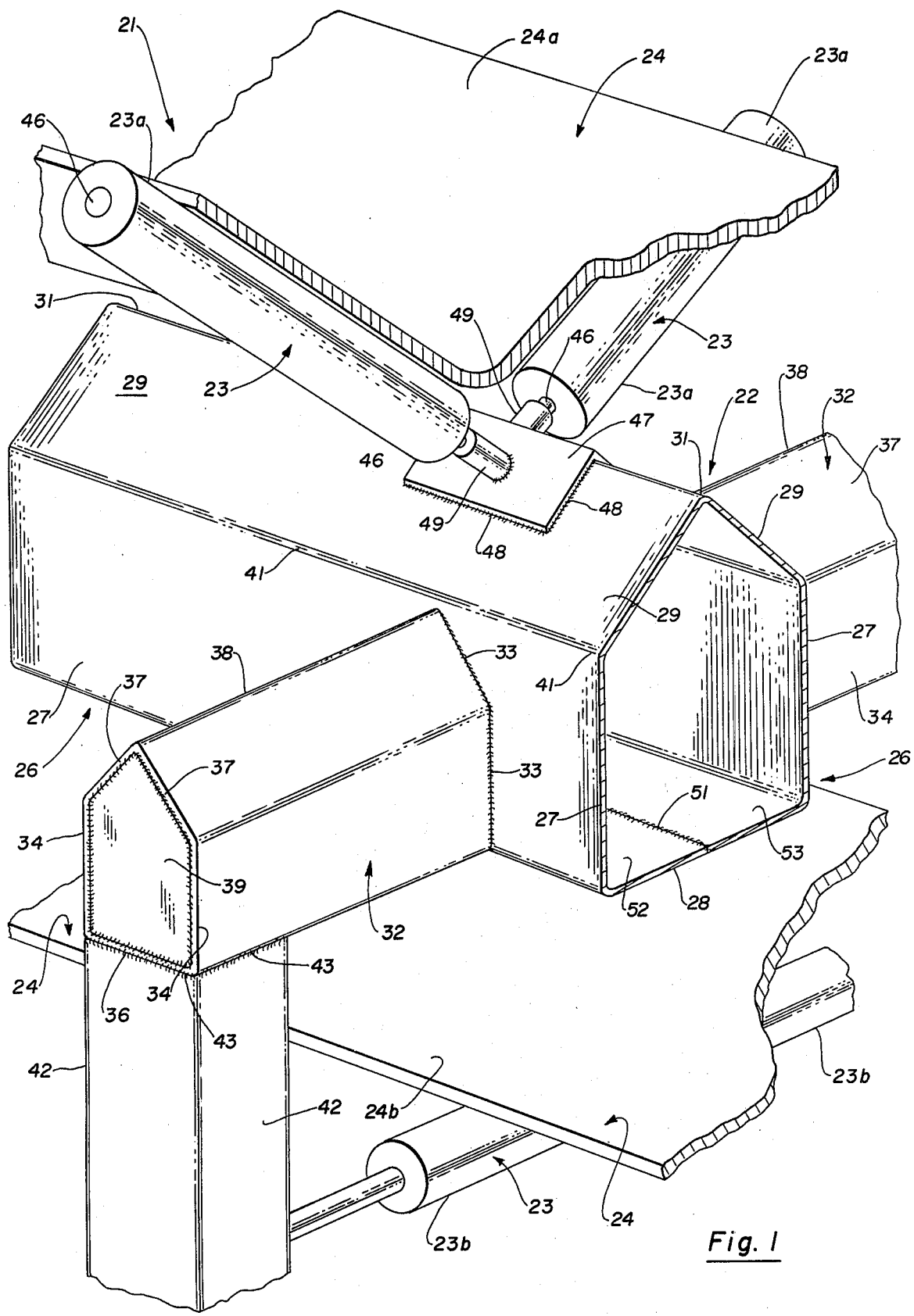
FIG. 1 is a fragmentary top perspective view, partially in cross-section and partially broken away, of a conveyor assembly having a support structure and tubular beam constructed in accordance with the present invention.

Referring now to the drawing, a conveyor assembly, generally designated 21, is shown which includes a support structure, generally designated 22, a plurality of roller elements or means 23, and an endless belt 24. This broad combination is well known in the prior art, and the present invention resides in the improved support structure or frame 22.

In order to provide a high strength, easily assembled support frame which further is free of debris collecting surfaces, the improved support structure of the present invention includes a longitudinally extending tubular beam, generally designated 26, which is positioned subjacent an upper portion 24a of belt 24. Preferably beam 26 is positioned beneath belt portion 24a at about the middle of the belt, and beam 26 extends longitudinally over substantially the entire length of the belt, terminating proximate the belt reversing rollers at the ends of the conveyor.

Longitudinally extending tubular beam 26 is formed to provide a very high strength, torsion resistant, support beam and includes a pair of vertically oriented parallel side walls 27, a horizontally extending bottom wall 28 connecting side walls 27, and a pair of upwardly sloped top walls 29 extending from the upper edges 41 of the side walls and meeting in a longitudinally extending apex 31. As so constructed, and with apex 31 pointing upwardly, beam 26 is devoid of debris or contaminant trapping surfaces. Moreover, and equally importantly, beam 26 is constructed in a manner which permits it to be easily secured or connected to other frame elements to provide a high strength support structure for a conveyor or the like.

Vertically oriented side walls 27 provide longitudinally extending, laterally facing surfaces to which it is relatively easy to secure other beams or frame elements, such as cross-beam members 32. Cross-beams 32 can simply be cut to any desired length with a vertical cut and the ends of the cross-beams welded at 33 to side walls 27. This welded connection is relatively easy to form in the field without specialized equipment or brackets or adaptors and will provide a very high strength coupling of the beams together as a unit for support of the conveyor load. As is apparent, cross-beams 32 can be secured to longitudinal beam 26 at any position along walls 27 and can be secured to one or both of walls 27.

As will be seen from FIG. 1, cross-beam members 32 are preferably formed in the same manner as longitudinal beam 26 so that both the longitudinal beam and the cross-beam members are free of upwardly facing horizontal surfaces which would cause a trapping or buildup of contaminants on the conveyor frame. Thus, cross-beams 32 are tubular and formed with side walls 34, bottom wall 36 and a pair of sloped or upwardly converging top walls 36 terminating in apex 38.

In order to prevent entry of debris into the ends of the hollow tubular beams of the present invention, it is preferable to provide an end closure plate 39 (shown mounted in the left cross-beam), which is mounted in the beam end and welded thereto. Plate 39, being vertically oriented, will similarly not provide contaminant trapping surfaces. End closure plates (not shown) can also be provided in the ends of beam 26.

As also will be apparent, cross-beam members 32 advantageously has a height not greater than the vertical height of walls 27 of the longitudinal beam. If the cross-beam height is greater, apex 38 would extend above walls 27 and create a configuration which would trap material or the bottom wall would extend below beam 26. It is possible to use cross-beams of the same size as beam 26, as long as apex 38 is not secured to walls 27 at a point above the top edge 41 of walls 27, but since the bottom wall 36 and the side walls 34 of the cross-beam will then extend to a position below the bottom wall 28 of the longitudinal beam, an end closure plate should be mounted in the end of the cross-beam secured to wall 27.

Support of conveyor 21 at the desired vertical height over a support surface can advantageously be accomplished by employing vertically extending support post 42 positioned beneath cross-beams 32 and secured to horizontal bottom wall 34, for example, by welding at 43. Thus, the horizontal downwardly facng bottom wall affords another surface to which support frame members, and particularly posts, can be readily secured. Post member 42 can take a number of different shapes, since only vertical, unobstructed side walls are presented.

Mounted to vertical posts 42 are roller elements 23b for rolling support of a lower return portion 24b of belt 24. Thus, the return portion of belt 24 is directly below longitudinal beam 26, and the roller mounting structure similarly is clean or free of particle trapping surfaces.

The conveyor assembly support structure and the beam of the present invention are particularly well suited for the support of belt 24 in a trough-like shape or cross-section. Thus, a pair of laterally extending upper roller elements 23a are rotatably mounted on shafts 46 that in turn can be mounted directly to sloped top walls 29 or mounted to an angle bracket 47, which is nested over apex 31 and supported to top walls 29. Bracket 47 can be secured to beam 26 by welding at 48, and the roller supporting angle bracket can be secured at any location along beam 26, including the position as shown in the drawing in which rollers 23a are superimposed over cross-beams 32.

If desired, the angle of convergence of top walls 29 can be selected so that shafts 46 and shaft mounting members 49 are substantially perpendicular to the top walls. This is not necessary, however, and angle bracket 47 and the roller mounting structure can be pre-fabricated in a shop, with securement of bracket 47 to beam 26 taking place in the field by a simple welding step.

The tubular beam of the present invention can advantageously be formed from a single sheet of metal that is roll formed, bent, or deformed on a press brake or the like and welded along a seam. Trapezoidal tubes have been previously formed, but they have never been incorporated into a conveyor frame, as contemplated in the present invention. U.S. Pat. No. 2,959,256 and Van Huffel Catalog L-56, published Jan., 1953 at page 60, show trapezoidal tubular members.

In order to provide maximum strength, while still provided a beam that can be readily formed, the present beam is formed by starting from an edge of the sheet and bending the same to form the various walls until the opposite edge meets at a seam 51 that extends longitudinally along about the midpoint of bottom wall 28. Thus, the bottom wall is comprised of two strip portions 52 and 53 proximate the opposite edges of the sheets used to make the tubular beam, and seam 51 is welded from the exterior of the tube to permanently close the tube.

In the preferred form tubular members 26 and 32, the height of side walls 27 and 34 is about equal to the width of bottom walls 28 and 36, respectively. The characteristic "dog house" shape of the beam is completed by providing sloping debris deflecting top walls that meet in an apex having a height above the upper edges of the side walls of about one half of the height of the side walls. These proportions can, however, be varied and still achieve the advantages of the present invention, but these proportions insure a high strength, torsion resistant beam.

What is claimed is:

1. A high strength, debris free, easily cleaned conveyor assembly support structure for use in supporting a plurality of roller elements and an endless belt mounted for movement over said roller elements, said support structure formed for support of and having said roller elements mounted thereto, wherein the improvement in said conveyor assembly support structure is comprised of:

said support structure including a longitudinally extending beam positioned substantially along the length of and subjacent an upper portion of said belt;

said beam being formed as a tubular member having a pair of vertical side walls, a bottom wall means connecting said side walls, and a pair of upwardly sloped top walls extending from said side walls and meeting in a common apex;

said support structure further including a plurality of cross-beam members having sloped top walls and secured to said vertical side walls of said longitudinally extending beam in a manner to not extend above said vertical side walls, and extending from both sides thereof;

said sloped top walls of said longitudinally extending beam being formed for support of said roller elements; and said longitudinally extending beam and said cross-beam members being free of upwardly facing horizontally oriented surfaces.

2. The conveyor assembly support structure as defined in claim 1 wherein, said cross-beam members are formed as defined for said longitudinally extending beam.

3. The conveyor assembly support structure as defined in claim 2, and a plurality of vertically extending support posts positioned beneath said cross-members and secured to the horizontally extending bottom wall of said cross-beam members.

4. The conveyor assembly support structure as defined in claim 3 wherein, a portion of said roller elements are mounted to said support posts below said longitudinally extending beam for support of a lower return portion of said belt.

5. The conveyor assembly support structure as defined in claim 1, and said roller elements are mounted to said sloped top walls of said longitudinally extending beam by an angle bracket supported on said top walls in nested relation thereto.

6. The conveyor assembly support structure as defined in claim 1 wherein, said roller elements are provided as pairs of laterally extending rollers mounted to said top walls of said longitudinally extending beam for support of said belt in a trough-like configuration.

7. The conveyor assembly support structure as defined in claim 1 wherein, said longitudinally extending beam is formed from a single sheet of metal bent to form a tubular member and joined together along a longitudinally extending seam proximate the midpoint of said bottom wall.

* * * * *

UNITED STATES PATENT AND TRADEMARK OFFICE
CERTIFICATE OF CORRECTION

PATENT NO. : 4,241,826
DATED : December 30, 1980
INVENTOR(S) : Charles J. Billington It is certified that error appears in the above-identified patent and that said Letters Patent are hereby corrected as shown below:

In column 1, line 41, delete "3,796,505" and insert ---3,796,503---.

In column 3, line 46, delete "36" and insert ---37---.

In column 4, line 12, after "23b" insert ---formed---.

In column 4, line 46, change "provided" to ---providing---.

In column 6, claim 3, line 4, after "cross-" insert ---beam---.

Signed and Sealed this

Twenty-fourth Day of March 1981

[SEAL]

Attest:

RENE D. TEGTMEYER

Attesting Officer

Acting Commissioner of Patents and Trademarks